July 7, 1953     F. H. PARKER     2,644,483
HOT AND COLD WATER MIXING VALVE
Filed Aug. 2, 1950     2 Sheets-Sheet 1
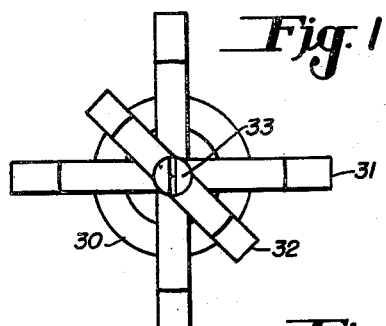
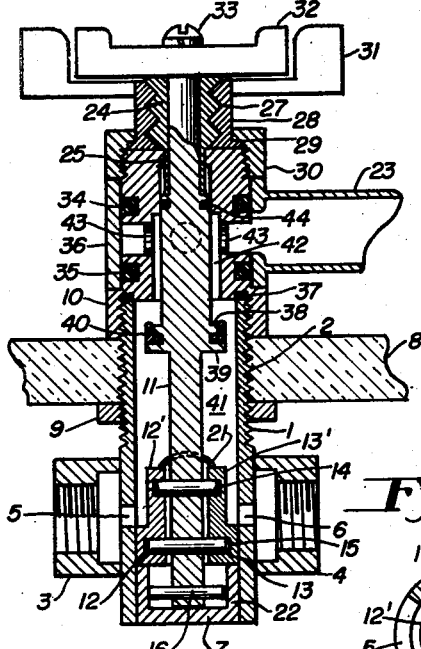
INVENTOR.
FRANK H. PARKER
BY
*Frank H. Harmon*
ATTORNEY July 7, 1953          F. H. PARKER          2,644,483
HOT AND COLD WATER MIXING VALVE
Filed Aug. 2, 1950          2 Sheets-Sheet 2
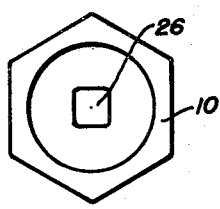
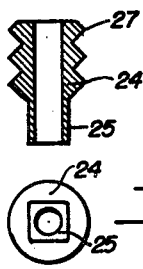
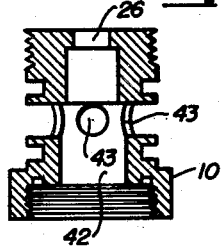
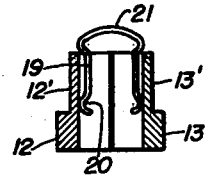
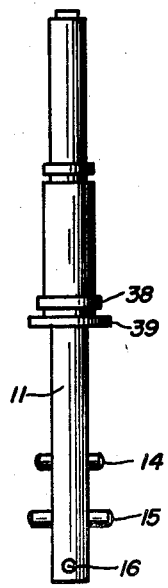
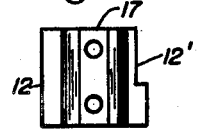
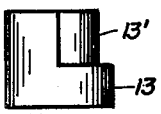
INVENTOR.
FRANK H. PARKER
BY
*Frank H. Harmon*
ATTORNEY Patented July 7, 1953

2,644,483

UNITED STATES PATENT OFFICE 2,644,483

HOT AND COLD WATER MIXING VALVE

Frank H. Parker, Cleveland Heights, Ohio, assignor of one-half to Stephen C. Peplin, doing business as Lakewood Manufacturing & Engineering Co., Westlake, Ohio Application August 2, 1950, Serial No. 177,160

3 Claims. (Cl. 137—605)

This invention relates in general to mixing valves and more particularly to improvements in combination hot and cold water faucets and shower attachments.

One of the primary objects of the invention is to provide such a faucet, having a single discharge outlet, with manual control means whereby, with the simple manipulation with the same hand, the operator may control the proportion of flow of hot and cold water, even to the exclusion of each other, and also control the overall pressure volume of flow through the discharge outlet.

Another object is to so combine such manual control as to be convenient for operation by one hand and at the same time so independent of each other as to not interfere with each other either as to manual control or in their own functions.

A further object is to provide such a faucet in which all parts, including a single operating stem and a single valve for volume and mixture control may be installed, removed, and replaced with the maximum of ease.

Another object is to provide a faucet which is positively leak-proof and which does not require auxiliary check valves or bushings and does not require a sleeve for the valve operating stem.

A further object is to provide a single valve which is turnable by one manual control for mixing control and elevatable by an independent manual control for flow-volume control.

A still further object is to provide an improved temperature control operable independently of the volume control, for admitting desired quantities of hot and cold water into the mixing chamber, which control includes a single two-piece rotatable valve and provided with resilient means for spreading the valve into automatic proper alignment, for automatic compensation for wear and for eliminating the necessity for bushings.

With the foregoing and other objects in view, the invention resides in the combination of parts and in the details of construction hereinafter set forth in the following specification and appended claims, certain embodiments thereof being illustrated in the accompanying drawings, in which:

Figure 1 is a top plan view of the two independent valve control handles;

Figure 2 is a view in vertical section taken through the faucet, showing its attachment to its base, the sealing valve being shown open and the single mixing and volume control valve being shown in position to open both the hot and cold water supply to the mixing chamber;

Figure 3 is a view similar to that of Figure 2, showing the sealing valve closed and the single-mixing and volume control valve in position to close both the hot and cold water supply to the mixing chamber;

Figure 4 is a view in cross section taken through the mixing valve along line 4—4 of Figure 2;

Figure 5 is a view similar to Figure 4, showing the single valve adjusted to a position at an angle to that of Figure 4 to open the hot and close the cold water supply to the mixing chamber;

Figure 6 is a view similar to Figures 4 and 5, showing the single mixing valve adjusted to a position to close the hot and open the cold water supply to the mixing chamber;

Figure 7 is a view in cross section of the bottom plug, showing its limit stops for the valve stem cross pin;

Figure 8 is a view in vertical section taken through the screw-threaded sleeve of the volume control handle;

Figure 9 is a top plan view of the spout carrier;

Figure 10 is a view in vertical section taken through the spout carrier;

Figure 11 is a view in vertical section taken through the helically threaded cam which engages the sleeve of Figure 8;

Figure 12 is a bottom plan view of the lower extension of the cam of Figure 11 that engages the top plate of the spout carrier;

Figure 13 is a view in vertical section taken through the nut for anchoring the volume control handle to the spout carrier;

Figure 14 is a vertical sectional view taken through both segments of the valve, showing the spring for expanding the segments radially outwardly;

Figure 15 is a view in vertical elevation of the valve stem;

Figure 16 is a top plan view of one of the valve segments;

Figure 17 is a view in elevation, taken from the interior of the valve segment of Figure 16;

Figure 18 is a top plan view of the other valve segment; and

Figure 19 is a view in elevation of the exterior of the valve segment of Figure 18.

Referring more particularly to the drawings, I form my main faucet body of a metallic hollow tubing 1, externally screw-threaded at 2, and to tubing 1, I secure two cross pipes 3 and 4 by any suitable means, for attachment to sources of hot and cold water, respectively. In alignment with the interior passages of pipes 3 and 4 I provide ports 5 and 6, respectively, in body 1. I plug the bottom of body 1 with a plug 7.

For purposes of assembly and attachment of the faucet I may initially secure the body, including tube 1 and cross pipes 3 and 4, to a wall, or other base 8 by means of a lower lock nut 9 on the screw threads 2 under wall 8. I may then fit the single expansible volume and mixture control valve onto its operating stem 11. This valve is formed of two generally complementary semi-cylindrical segments 12 and 13.

When the two hollow valve segments are assembled their semi-circular concave surfaces are opposed and their two sets of abutting surfaces spaced at 180 degrees apart. One half of segment 12 has a uniform wall thickness 12 throughout its vertical length, the remaining half having its lower wall thickness the same but having the upper part reduced at 12' so that it is spaced inwardly from the inner surface of the body 1. The other segment 13 is likewise formed with the upper portion of one half of its wall thickness reduced at 13'. As shown in Figures 4, 5 and 6, the segments are so arranged that the two full wall thickness portions 12 and 13 abut each other and the two reduced wall thickness portions 12' and 13' abut each other. Ports 5 and 6 are formed in body 1 and no bushings are employed. Ports 5 and 6 are diametrically opposed and each preferably a 70 degree arc. This leaves two arcs of adjacent valve sections 12 and 13 of 90 degrees each and two adjacent valve sections 12' and 13' of 90 degrees each.

The single valve stem is provided with three cross pins 14, 15 and 16. Valve portion 12 has a vertically extending boss 17 and valve portion 13 has a correspondingly vertically extending boss 18 diametrically opposed to boss 17. The two valve portions 12 and 13 may be manually positioned so that one end of each of the two cross pins 14 and 15 engage boss 17 and the other end of each of the cross pins 14 and 15 engage boss 18. I then insert a pair of expansible springs, one on each side of stem 11, to provide a means for urging the two valve portions 12 and 13 laterally apart. Such a spring is shown in detail in Figure 14 at 19 to comprise two legs with lower bowed portions 20 and an upper loop portion 21 for easy access by a tool for disassembling purposes.

I then insert the stem with the valve portions 12 and 13 into body 1. As this is done the lower end of the stem 11 bottoms on plug 7 and the lower cross pin 16 is positioned to rotate between stop members 22 in plug 7.

I then screw the carrier 10, for the usual swivel outlet spout 23, onto the upper portion of threads 2 on the body down against the wall 8 to lock the assembly to the wall.

Onto the upper cylindrical end of valve stem 11 I slide a cam member 24 which has a round bore to receive the valve stem. This cam 24 has a lower reduced extension 25 of square cross section to fit in a pocket 26 of square cross section in the upper end of spout carrier 10. The upper enlarged portion of cam 24 is provided with external helical threads 27.

Onto threads 27 I screw a correspondingly internally helically threaded member 28 which has a lower flange 29 to rest on the upper surface of the spout carrier 10 and secured in place thereon by an anchor nut 30.

Rigid with member 28 is a manual handle 31, which is shown in Figure 1 to have four hand engageable prongs, so that anchor nut 31 anchors the handle 31 in place, as shown in Figure 2. The remaining assembly operation is the positioning of the other manual handle 32 onto the stem 11, above handle 31, and securing the handle 32 fixedly to the stem by a screw 33.

In addition to the above described parts, I provide sealing rings 34 and 35 between the spout carrier 10 and the spout ring 36 and a sealing ring 37 between the spout carrier 10 and the body 1. In addition to the other accessories, the stem 11 has a small upper flange 38 and a larger lower flange 39 to carry therebetween a flexible sealing element 40, to comprise what is known to the trade as a "Maytag" seal. A seal 44 is carried between the stem and the spout carrier.

As to the mode of operation, reference is made to Figures 2 and 4, which show the single valve adjusted to a position where cold and hot water ports 5 and 6, respectively, are equally opened. In other words, the two reduced wall thickness portions 12' and 13' are brought into equal registry with cold and hot water ports 5 and 6, respectively, which permits cold and hot water to pass into the mixing chamber 41, as the full thickness wall sections 12 and 13 are only partially closing ports 5 and 6, respectively. The lower full wall thickness portions of reduced sections 12' and 13' are positioned below ports 5 and 6, when the valve is in its lowermost position of Figure 2, which calls for full volume of an equal mixture of hot and cold water flow into the mixing chamber. It is to be borne in mind that spring 19 is expanding the two complementary valve segments radially outwardly into direct engagement with the inner surface of the faucet body. The lower portions of reduced sections 12' and 13', when the valve is in its lowermost position of Figure 2, are merely acting as valve positioning elements.

When it is desired to fully close the cold water supply port 5 and fully open the hot water supply port 6, the mixture control handle 32 is turned until the bottom cross pin 16 of valve stem 11 abuts the limit stop 22 in bottom plug 7, as shown in Figure 7. This turning of handle 32 and the valve stem 11 is purely rotational, with no linear movement of the stem or valve, and entirely independent of volume control handle 31 and the parts the latter operates. This turning of handle 32, just above described in connection with Figure 7, through the valve stem cross pins 14 and 15 and their engagement in valve segment bosses 17 and 18, rotatably adjusts the valve to the position shown in Figure 5. Here the entire arc of hot water port 6 is fully open because it is opposed by the adjacent reduced sections 12' and 13' which are spaced radially inwardly of the faucet body. However, the entire arc of the cold water port 5 is closed because it is opposed by the full vertical wall thickness of segment 12. It is also of great importance to note that the space between the abutting ends of full wall thickness portions 12 and 13 is concealed from, and not exposed to, the port 5, in order to avoid leakage. The limit stops 22 for cross pin 16 are predeterminedly positioned to provide for this so as to prevent valve adjustment that might otherwise make for such leakage.

When it is desired to fully close the hot water port 6 and fully open the cold water port 5, the mixture control handle 32 is rotated in the opposite direction to move the valve stem 11 and its cross pin 16 clockwise, as viewed in Figure 7, until the two ends of cross pin 16 abut the opposite limit stops 22 in plug 7. This results in a rotational adjustment of the valve into the position shown in Figure 6. Here the full vertical wall thickness 13 bridges the entire arc of hot water port 6, to close the same. Here, again, the space between the abutting full vertical wall thicknesses 12 and 13 are concealed from, and not exposed to, the hot water port 6, in order to avoid leakage. The cold water port 5, however, has its entire arc opposite the reduced wall thickness valve portion 12' so as to be fully open for full volume cold water flow into the mixing chamber.

As long as the "Maytag" seal, or sealing valve 40, carried by the single valve stem 11 between flanges 38 and 39 is not seated to close annular passage 42, around the stem in the spout carrier 10, the fluid in mixing chamber 41 flows past sealing valve 40, through passage 42, out through ports 43 in the spout carrier 10 and out through the swivel spout 23.

With the sealing valve 40 downward away from its seat, as shown in Figure 2 the single mixture control valve 12, 13, may be adjusted in any desired position for hot or cold or hot and cold water flow. This is accomplished turning handle 32 in the appropriate direction and amount. Being secured to handle 32, the stem 11 is also turned as are the two valve segments 12 and 13 by reason of the engagement of the stem cross pins 14 and 15 in the valve segment bosses 17 and 18. This has been described in connection with Figures 2, 4, 5, 6 and 7. It follows that the mixing valve may be adjusted to various positions calling for pure hot or pure cold water or any proportionate flow into the mixing chamber.

For volume control of flow into the mixing chamber, a turning of handle 31 in the appropriate direction also rotates its internally helically threaded member 28 whose threads engage threads 27 of cam member 24. The square extension 25 of member 24 engaging the square recess 26 of spout carrier 10 prevents turning of cam member 24. Consequently a turning of handle 31 and its member 28 causes vertical movement of cam member 27. Inasmuch as handle 32 rests on top of cam 27 and is secured to stem 11, the stem is correspondingly moved vertically without rotation.

Figure 3 shows the handle 31 to have been turned to such an extent as to seat sealing valve 40 so as to close the annular passage 42 to close flow from the mixing chamber 41 therethrough to the spout. Moreover, the stem 11 has also been raised sufficiently to bring the lower full wall thickness of both valve segments 12 and 13 into such position as to close both the hot and cold water ports 6 and 5. In this elevated position of the valve stem a turning of the same in either direction accomplishes nothing inasmuch as the two ports 5 and 6 will remain closed and cannot be opened by rotation of the valve by the mixture control handle 32.

It will be appreciated, however, that with respect to the extreme lower stem position of Figure 2, in which the sealing valve 40 is unseated, and the extreme upper stem position of Figure 3, in which the valve 40 is seated, and both ports 5 and 6 are fully closed, there are many degrees of adjustment of the lower full wall thickness of the sections of valve segments 12 and 13 from ineffective positions of Figure 2 below the level of ports 5 and 6 up to its elevated fully effective position of Figure 3 where they are able to close ports 5 and 6 so as to adjust the valve for controlling the volume of flow, independently of mixture of hot and cold water, into the mixing chamber.

Thus, the turning of handle 31 raises or lowers the stem and the valve segments to bring about the full volume flow of Figure 2 to the complete shutoff of flow into the mixing chamber as well as from the mixing chamber to the spout, as shown in Figure 3. This operation of handle 31 does not turn the stem or the valve segments to in any way effect the proportionate flow of hot and cold water into the mixing chamber. The proportionate flow of hot and cold water into the mixing chamber independently under the control of handle 32 for rotating the valve segments to any rotational adjustment at any elevational volume control adjustment effected by handle 31.

It will thus be seen that I have provided a combined mixing and volume control faucet assembly involving the minimum number of inexpensive parts calling for the maximum of ease of assembly and disassembly. I employ two separately and independently operating handles for hot and cold water mixture and volume control. I employ a single stem without a sleeve and a single valve without bushings to effect mixture and volume control. The single valve is expansible to be selfaligning and wear compensating. Through independent manual controls the single valve regulates mixture and volume. The sealing valve carried by the stem works with fluid pressure to be manually closed to close flow from the mixing chamber to the discharge spout. The hot and cold water ports are in the faucet body and no bushings are employed. Limit stops are provided for rotational adjustments of the valve for mixture control. The arcs of the hot and cold water supply ports are so predetermined with respect to arcs of the valve segments that permits full closing of either port by either segment without exposing the space between the abutting valve segment ends, so as to avoid leakage, and the limit stops are also predetermined as to prevent such adjustment that would bring about such leakage. While I have shown two separate handles for mixture and volume control, it is to be understood that the rotational and elevational movements of the valve stem, and consequently of the single valve and the seal, may be combined in one handle, if desired.

I claim:

1. In a faucet having a casing, a mixing chamber and a discharge outlet, a pair of fluid pressure lines and a transverse arcuate port for each leading to said mixing chamber, a single combined mixture and volume control valve for said ports arranged in said casing between said pressure lines and said mixing chamber, said valve being carried by a single stem and comprising complementary semi-circular hollow segments with resilient means to urge them outwardly in said casing, each of said valve segments, each having uniform lower wall thicknesses, each having adjacent upper wall thicknesses equal to that of the lower segment portions, and each having adjacent upper wall thickness sections that are annularly reduced so as to be spaced radially inwardly from said casing to be ineffective to close said ports while the remainder of said segments are effective as closers for said ports throughout their arcuate length, a pair of independently manually operable controls, one for rotating said stem for rotating said valve for regulating the proportion of fluid flow from said lines past ports into said mixing chamber and the other manual control for linearly adjusting said stem for linearly adjusting said valve to control the volume of fluid flow from said lines past said ports into said mixing chamber.

2. In a faucet having a casing, a mixing chamber and a discharge outlet, a pair of fluid pressure lines and a transverse arcuate port for each in said casing leading to said mixing chamber, a single combined mixture and volume control valve for said ports arranged in said casing between said pressure lines and said mixing chamber, said valve being carried by a single valve stem and comprising complementary semi-circular hollow segments with spring means to urge them outwardly into direct engagement with the inner surface of said casing, each of said valve segments, each having uniform lower wall thicknesses, each having adjacent upper wall thicknesses equal to that of the lower segment portions, and each having adjacent upper wall thickness sections that are annularly reduced so as to be spaced radially inwardly from said casing to be ineffective to close said ports while the remainder of said segments are effective as closers for said ports throughout their arcuate length, a pair of independently manually operable controls, one for rotating said stem for rotating said valve for regulating the proportion of fluid flow from said lines past said ports into said mixing chamber and the other manual control for linearly adjusting said stem for linearly adjusting said valve to control the volume of fluid flow from said lines past said ports into said mixing chamber and a seal carried by said valve stem for opening and closing the fluid flow from said mixing chamber to the discharge outlet in response to linear adjustments of said valve stem.

3. In a faucet having a casing, a mixing chamber and a discharge outlet, a pair of fluid pressure lines and a transverse arcuate port for each leading to said mixing chamber, a single combined mixture and volume control valve for said ports arranged in said casing between said pressure lines and said mixing chamber, said valve being carried by a single stem and comprising complementary semi-circular hollow segments with a removable expansible spring to urge them outwardly in said casing, each of said valve segments, each having uniform lower wall thicknesses, each having adjacent upper wall thicknesses equal to that of the lower segment portions, and each having adjacent upper wall thickness sections that are annularly reduced so as to be spaced radially inwardly from said casing to be ineffective to close said ports while the remainder of said segments are effective as closers for said ports throughout their arcuate length, a pair of independently manually operable controls, one for rotating said stem for rotating said valve for regulating the proportion of fluid flow from said lines past said ports into said mixing chamber and the other manual control for linearly adjusting said stem for linearly adjusting said valve to control the volume of fluid flow from said lines past said ports into said mixing chamber.

FRANK H. PARKER.

References Cited in the file of this patent

UNITED STATES PATENTS

| Number | Name | Date |
|---|---|---|
| 1,502,483 | O'Flaherty | July 22, 1924 |
| 1,949,300 | Fitter | Feb. 27, 1934 |
| 2,158,342 | Trader | May 16, 1939 |
| 2,308,127 | Symmons | Jan. 12, 1943 |
| 2,432,225 | Carbon | Dec. 9, 1947 |
| 2,501,657 | Barkelew | Mar. 28, 1950 |

FOREIGN PATENTS

| Number | Country | Date |
|---|---|---|
| 555,368 | Great Britain | of 1943 |